(12) United States Patent
Monro

(10) Patent No.: US 8,577,094 B2
(45) Date of Patent: Nov. 5, 2013

(54) IMAGE TEMPLATE MASKING

(76) Inventor: Donald Martin Monro, Frome (GB)

( * ) Notice: Subject to any disclaimer, the term of this patent is extended or adjusted under 35 U.S.C. 154(b) by 579 days.

(21) Appl. No.: 12/757,250

(22) Filed: Apr. 9, 2010

(65) Prior Publication Data

US 2011/0249872 A1 Oct. 13, 2011

(51) Int. Cl.
*G06K 9/68* (2006.01)
(52) U.S. Cl.
USPC .................. 382/117; 382/218; 382/220
(58) Field of Classification Search
USPC .................. 382/117, 209, 217, 218, 220
See application file for complete search history.

(56) References Cited

U.S. PATENT DOCUMENTS

| | | | |
|---|---|---|---|
| 3,845,466 A | 10/1974 | Hong | |
| 4,641,349 A | 2/1987 | Flom et al. | |
| 4,817,183 A | 3/1989 | Sparrow et al. | |
| 4,896,363 A | 1/1990 | Taylor et al. | |
| 5,251,131 A | 10/1993 | Masand et al. | |
| 5,291,560 A | 3/1994 | Daugman | |
| 5,572,596 A | 11/1996 | Wildes et al. | |
| 5,631,971 A | 5/1997 | Sparrow et al. | |
| 5,751,836 A | 5/1998 | Wildes et al. | |
| 5,841,888 A | 11/1998 | Setiak et al. | |
| 5,901,238 A | 5/1999 | Matsushita | |
| 5,924,094 A | 7/1999 | Sutter | |
| 5,956,122 A | 9/1999 | Doster | |
| 5,978,793 A | 11/1999 | Kashyap et al. | |
| 6,018,739 A | 1/2000 | McCoy et al. | |
| 6,067,369 A | 5/2000 | Kamei | |
| 6,081,620 A | 6/2000 | Anderholm | |
| 6,144,754 A | 11/2000 | Okano et al. | |
| 6,229,906 B1 | 5/2001 | Pu et al. | |
| 6,243,492 B1 | 6/2001 | Kamei | |
| 6,247,813 B1 | 6/2001 | Kim et al. | |
| 6,301,376 B1 | 10/2001 | Draganoff | |
| 6,360,021 B1 | 3/2002 | McCarthy et al. | |
| 6,424,727 B1 | 7/2002 | Musgrave et al. | |
| 6,505,193 B1 | 1/2003 | Musgrave et al. | |
| 6,526,160 B1 | 2/2003 | Ito | |
| 6,614,919 B1 | 9/2003 | Suzaki et al. | |
| 6,701,313 B1 | 3/2004 | Smith | |
| 6,714,665 B1 | 3/2004 | Hanna et al. | |
| 6,757,411 B2 | 6/2004 | Chau | |
| 6,801,661 B1 | 10/2004 | Sotak et al. | |
| 6,879,718 B2 | 4/2005 | Hullender | |

(Continued)

FOREIGN PATENT DOCUMENTS

| | | |
|---|---|---|
| DE | 19842572 | 3/2000 |
| EP | 1237117 A | 9/2002 |

(Continued)

OTHER PUBLICATIONS

Unel, M., et al.; "Fitting Circle Polynomials to Planar Objects"; Proc. of the First Workshop on Computer Vision, Pattern Recognition and Image Processing; XP002482595; Oct. 23, 1995.

(Continued)

*Primary Examiner* — Jon Chang
(74) *Attorney, Agent, or Firm* — Ungaretti & Harris, LLP

(57) ABSTRACT

A method of identifying images as matching comprises comparing two image templates using a master mask to select corresponding codes from the templates. The master mask excludes blocks from the matching process and/or weights blocks according to their known or expected reliability.

21 Claims, 3 Drawing Sheets

(56) References Cited

U.S. PATENT DOCUMENTS

| | | |
|---|---|---|
| 6,909,808 B2 | 6/2005 | Stanek |
| 7,009,495 B2 | 3/2006 | Hughes et al. |
| 7,136,514 B1 | 11/2006 | Wong |
| 7,197,166 B2 | 3/2007 | Jeng |
| 7,302,087 B2 | 11/2007 | Cho |
| 7,379,567 B2 | 5/2008 | Azuma et al. |
| 7,483,569 B2 | 1/2009 | Bhagavatula et al. |
| 7,650,020 B2 | 1/2010 | Monro |
| 2001/0056485 A1 | 12/2001 | Barrett et al. |
| 2002/0129012 A1 | 9/2002 | Green |
| 2002/0163506 A1 | 11/2002 | Matusis |
| 2003/0061233 A1 | 3/2003 | Manasse et al. |
| 2003/0086617 A1 | 5/2003 | Huang |
| 2004/0165755 A1 | 8/2004 | Hillhouse |
| 2004/0202355 A1 | 10/2004 | Hillhouse |
| 2005/0097131 A1 | 5/2005 | Benco et al. |
| 2005/0102325 A1 | 5/2005 | Gould et al. |
| 2005/0175225 A1 | 8/2005 | Shinzaki |
| 2005/0193016 A1 | 9/2005 | Seet et al. |
| 2005/0234901 A1 | 10/2005 | Caruso |
| 2006/0026128 A1 | 2/2006 | Bier |
| 2006/0104493 A1 | 5/2006 | Hsieh et al. |
| 2006/0147094 A1 | 7/2006 | Yoo |
| 2006/0222212 A1 | 10/2006 | Du et al. |
| 2007/0036397 A1 | 2/2007 | Hamza |
| 2007/0201728 A1 | 8/2007 | Monro |
| 2008/0013808 A1* | 1/2008 | Russo et al. .................. 382/125 |
| 2008/0097983 A1 | 4/2008 | Monro |
| 2008/0097992 A1 | 4/2008 | Monro |
| 2008/0170759 A1 | 7/2008 | Monro |
| 2008/0170760 A1 | 7/2008 | Monro |
| 2009/0060348 A1 | 3/2009 | Monro |
| 2009/0232361 A1* | 9/2009 | Miller ........................... 382/115 |
| 2010/0166265 A1 | 7/2010 | Monro |

FOREIGN PATENT DOCUMENTS

| | | |
|---|---|---|
| EP | 1403811 A | 3/2004 |
| WO | 02/065782 A1 | 8/2002 |
| WO | 2005/119581 A1 | 12/2005 |
| WO | 2007/096657 A1 | 8/2007 |
| WO | WO 2009041963 A1 * | 4/2009 |

OTHER PUBLICATIONS

Vijaya, K., et al.; "Iris verification using correlation filters"; Audio- and Video-Based Biometric Person Authentication; 4th International Conference, AVBPA 2003. Proceedings Jun. 9-11, 2003, Guildford, UK; Jun. 9-11, 2003; pp. 697-705; XP002440485, (Lectures Notes in Computer Science, vol. 2688).

Vijaya, K., et al.; "Optimal Tradeoff Circular Harmonic Function Correlation Filter Methods Providing Controlled In-Plane Rotation Response"; IEEE Transactions on Image Processing, IEEE Service Center, Piscataway, NJ, US; vol. 9, No. 6, Jun. 2000; XP011025606; ISSN: 1057-7149.

Wildes, R.P.; "Iris Recognition: An Emerging Biometric Technology"; Proc. of the IEEE; vol. 85, pp. 1348-1363; 1997.

Wong, W.Y.P., et al.; "Implementations of Partial Document Ranking Using Inverted Files"; Information Processing & Management; Elsevier, Barking, GB; vol. 29, No. 5, Oct. 1993; pp. 647-669; XP002035616.

Wyatt, H.; "The Form of the Human Pupil"; Vision Research; Pergamon Press, Oxford, GB; vol. 35, No. 14; pp. 2021-2036; XP001077732; ISSN: 0042-6989.

Zhang, D. D.; "Automated Biometrics Passage"; Automated Biometrics: Technologies and Systems; Kluwer Academic Publishers, Dordrecht, NL; 2000; pp. 170-175; XP002440484.

Zhang, D., et al.; "Eyelash Removal Method for Human Iris Recognition"; Proceedings of International Conference on Image Processing; Oct. 8, 2006; pp. 285-288; IEEE, New York, NY, US; XP007902986.

Tourapis, et al.; "New Results on Zonal Based Motion Estimation Algorithms—Advanced Predictive Diamond Zonal Search"; Proceedings of IEEE International Conference of Electronics, Circuits and Systems (ICECS—1999); pp. V-183-V-186; Sep. 1, 1999.

Smeaton, S.F., et al.; "The Nearest Neighbour Problem in Information Retrieval: An algorithm using upper bounds"; Sigir Forum, ACM; New York, NY, US; vol. 16, No. 1, 1981, pp. 83-87; XP009096620.

Siewchin, C., et al.; "Iris Authentication Using Privatized Advanced Correlation Filter"; Advances in Biometrics; International Conference Proceedings (Lecture Notes in Computer Science); vol. 3832; 2005; pp. 382-388; XP019026903.

Seow, et al.; "Image Based Fingerprint Verification"; 2002 Student Conference on Research and Development Proceedings; pp. 58-61; Shah Alam, Malaysia.

Sener, S., et al.; "Affine Invariant Fitting of Algebraic Curves Using Fourier Descriptors"; Pattern Analysis and Applications; Springer-Verlag; vol. 8, No. 1-2; Sep. 1, 2005; pp. 72-83; XP019381480; ISSN: 1433-755X.

Rakshit, et al.; "An Analysis of Image Sampling and Compression for Human Iris Recognition"; IEEE Trans. Information Forensic and Security; vol. 2, No. 3; Sep. 1, 2007; pp. 605-612.

Oirrak, A.; "Affine Invariant Descriptors Using Fourier Series"; Pattern Recognition Letters; Elsevier, Amsterdam, NL; Aug. 2002; pp. 1109-1118; XP004349759; ISSN: 0167-8655.

International Search Report for PCT/GB2005/002156 mailed Aug. 31, 2005.

International Preliminary Report on Patentability and Written Opinion for PCT/GB2005/002156 mailed Dec. 4, 2006.

International Preliminary Report on Patentability and Written Opinion of International Searching Authority for PCT/GB2007/000668 mailed Aug. 27, 2008.

International Search Report for PCT/GB2007/000668 mailed Jul. 18, 2007.

International Search Report for PCT/GB2007/004035 mailed Jan. 23, 2008.

International Preliminary Report on Patentability and Written Opinion of International Searching Authority for PCT/GB2007/004035 mailed Apr. 28, 2009.

International Search Report for PCT/EP2008/050372 mailed Jun. 17, 2008.

International Preliminary Report on Patentability and Written Opinion of International Searching Authority for PCT/EP2008/050372 mailed Jul. 21, 2009.

International Search Report for PCT/GB2007/002500 mailed Oct. 17, 2007.

International Preliminary Report on Patentability and Written Opinion for PCT/GB2007/002500 mailed Feb. 17, 2009.

International Preliminary Report on Patentability and Written Opinion for PCT1GB2007/004037 mailed Apr. 28, 2009.

Barron, J.L., et al., "Performance of optical flow techniques"; International Journal of Computer Vision; 12:1:43-77; 1994.

Boles, W. W., et al., "A Human Identification Technique Using Images of the Iris and Wavelet Transform"; IEEE, pp. 1185-1188; 1998.

Bonney, B. et al. "Iris pattern extraction using bit planes and standard deviations"; Conference Record of the Thirty-Eighth Asilomar Conference on Signals, Systems and Computers; pp. 582-586; 2004.

Clarysse, P., "Two-Dimensional Spatial and Temporal Displacement and Deformation Field Fitting from Cardiac Magnetic Resonance Tagging"; Medical Image Analysis, 2000, pp. 253-268; XP002482596.

Da Fontoura Costa, L., "Estimating Derivatives and Curvature of Open Curves"; Pattern Recognition; Elsevier, GB; Nov. 1, 2002, pp. 2445-2451; XP004819285; ISSN: 0031-3203.

Daugman, J.; "The Importance of Being Random: Statistical Principles of Iris Recognition"; Pattern Recognition, The Journal of the Pattern Recognition Society; vol. 36, pp. 279-291; 2003; Elsevier Science Ltd.

Dodis, Y., et al.; "Fuzzy Extractors: How to Generate Strong Keys from Biometrics and Other Noisy Data"; Advances in Cryptology: Eurocrypt 2004 Lecture Notes in Computer Science; LNCS, Springer-Verlag, BE; vol. 3027, 2004, pp. 523-540.

(56) References Cited

OTHER PUBLICATIONS

Du, Y., et al.; "Analysis of Partial Iris Recognition Using a 1-D Approach"; Proceedings of the 2005 IEEE International Conference on Acoustics, Speech, and Signal Processing; Mar. 18, 2005.

Ghosh, et al.; "An Algebra of Geometric Shapes"; IEEE Computer Graphics and Applications; 1993; pp. 50-59.

Horn, B.K.P., et al.; "Determining Optical Flow"; Artificial Intelligence (17), No. 1-3, pp. 185-203; Aug. 1, 1981.

Hull, J., et al.; "Document Image Matching and Retrieval With Multiple Distortion-Invariant Descriptors"; International Association for Pattern Recognition Workshop on Document Analysis Systems; 1995; pp. 379-396; XP002358354.

Hull, J., et al.; "Document Image Matching Techniques"; Symposium on Document Image Understanding Technology; Annapolis, MD; Apr. 30-May 2, 1997; pp. 31-35; XP002358355.

Kazuyuki, M., et al.; "An Efficient Iris Recognition Algorithm Using Phase-Based Image Matching"; Proc. IEEE International Conference on Image Processing, Genoa, 2005; pp. II-49-II-52.

Koichi, I. et al.; "A Fingerprint Recognition Algorithm Using Phase-Based Image Matching for Low-Quality Fingerprints"; Proc. IEEE International Conference on Image Processing; Genoa, 2005; pp. II-33-II-36.

Kong, W.K., et al.; "Accurate Iris Segmentation Based on Novel Reflection and Eyelash Detection Model"; Intelligent Multimedia, Video and Speech Processing; 2001; Proceedings of 2001 International Symposium, May 2-4, 2001; pp. 263-266; Hong Kong; XP10544713.

Kong, W-K., et al.; "Detecting Eyelash and Reflection for Accurate Iris Segmentation"; International Journal of Pattern Recognition and Artificial Intelligence; vol. 17, No. 6 (2003). pp. 1025-1034; World Scientific Publishing, Singapore; XP001171781.

Kumar, B V K, et al.; "Spatial frequency domain image processing for biometric recognition"; Proceedings of 2002 International Conference on Image Processing ICIP 2002; Rochester, NY, Sep. 22-25, 2002; New York, NY: IEEE, US; vol. 2 of 3, Sep. 22, 2002; pp. 53-56; XP010607258; ISBN: 0-7803-7622.

Ma, L., et al.; "Efficient Iris Recognition by Characterizing Key Local Variations"; IEEE Trans. on Image Processing; vol. 13, pp. 739-750, 2004.

Lestrel, P.; "Introduction and Overview of Fourier Descriptors"; Fourier Descriptors and Their Applications in Biology, 2001; pp. 22-44; XP008090742; ISBN: 978-0-521-45201-4.

Ma. K.-K., et al.; "Unequal-arm Adaptive Rood Pattern Search for Fast Block-matching Motion Estimation in the JVT/H.26L"; IEEE International Conference on Image Processing, ICIP 2003; pp. I-901-I-904.

Manikandan, M., et al.; "Motion estimation method for video compression—an overview", Wireless and Optical Communications Networks, 2006 IFIP International Conference.

Monro, D. M., et al.; "An Effective Human Iris Code with Low Complexity", Proc. IEEE International Conference on Image Processing (ICIP), Genoa, 2005.

Monro, D. M., et al.; "DCT-based Iris Recognition"; IEEE Trans. PAMI, vol. 29, No. 4, pp. 586-595; Apr. 1, 2007.

Namuduri, K. R., et al.; "Computation and performance trade-offs in motion estimation algorithms"; International Conference on Information Technology: Coding and Computing; 2001.

Niemel, L. P. W., et al.; "A Novel Description of Handwritten Characters for Use with Generalised Fourier Descriptors"; European Transactions on Telecommunications and Related Technologies; AEI, Milano, IT; Sep. 1, 1992; pp. 455-464; XP000315364; ISSN: 1120-3862.

International Search Report for PCT/EP2011/054902 mailed Oct. 17, 2011.

Written Opinion of International Searching Authority for PCT/EP2011/054902 mailed Oct. 17, 2011.

Mathieu, Adam, et al.; "Iris identification based on a local analysis of the iris texture"; Proceedings of 6th International Symposium on Image and Signal Processing and Analysis, ISPA 2009; IEEE, Piscataway, NJ, USA; Sep. 16, 2009, pp. 523-528; XP031552030; ISBN: 978-953-184-135-1; 2-2.1, 3.1-3.3, specifically equations (3)-(5), 5.12, 4-4.2 and Tables 1-5.

Gentile, James, et al.; "SLIC: Short-length iris codes"; IEEE 3rd International Conference on Biometrics: Theory, Applications, and Systems, BTAS '09; IEEE, Piscataway, NJ, USA; Sep. 28, 2009, pp. 1-5; XP031570261; ISBN: 978-1-4244-5019-0; abstract and III.

Hollinsgworth, K. P., et al.; "The Best Bits in an Iris Code"; IEEE Transactions on Pattern Analysis and Machine Intelligence, IEEE Service Center, Los Alamitos, CA, USA; vol. 31, No. 6, Jun. 1, 2009, pp. 964-973; XP011266637; ISSN: 0162-8828, DOI: 10.1109/TPAMI.2008.185; abstract, Figures 9-10 and 3.

Zhang, D. D., "Automated Biometrics, passage"; Jan. 1, 2000; Automated Biometrics: Technologies and Systems, Norwell, MA, USA: Kluwer Academic Publ.; pp. 170-175; XP002440484; ISBN: 978-0-7923-7856-3; p. 170.

International Search Report for PCT/GB2007/004037 mailed Mar. 7, 2008.

\* cited by examiner

IMAGE TEMPLATE MASKING

RELATED APPLICATION

None.

FEDERALLY SPONSORED RESEARCH OR DEVELOPMENT

Not applicable.

FIELD OF THE INVENTION

The present invention relates to a method and apparatus for matching of images that have been coded into templates. In particular, although not exclusively, it relates to biometric identification of an individual using an identifying image, for example, of an iris, face, hand, ear or fingerprint. Other examples are in target identification, classification or identification of molecular structures, classification and identification of images from astronomical telescopes and indeed to any image matching techniques where it may be convenient to select or weight only certain regions for identification and where depending on the nature of the object or other portion of the image being matched, information may be available about the reliability for matching of parts of the portion of the image or similar images.

BACKGROUND OF THE INVENTION

A variety of biometrically-based techniques for the identification of individuals have been proposed, many of which rely on iris recognition. Previous and existing patents in this field include the following: U.S. Pat. No. 4,641,349, Flom & Safir; U.S. Pat. No. 5,572,596, Wildes et al; U.S. Pat. No. 5,751,836, Wildes et al; U.S. Pat. No. 5,901,238, Matsushita; U.S. Pat. No. 5,956,122, Doster; U.S. Pat. No. 6,229,906, Pu & Psaltis; U.S. Pat. No. 6,247,813, Kim & Ryoo; U.S. Pat. No. 6,526,160, Ito; U.S. Pat. No. 5,291,560, Daugman; U.S. Pat. No. 7,650,520 Monro.

With conventional biometric recognition techniques, achieving a commercially acceptable False Acceptance Rate (FAR, where an individual is improperly identified as being known to the system) is in practice not too technically demanding. What is much more difficult, however, is achieving at the same time an acceptable False Rejection Rate (FRR, where a known individual is improperly rejected by the system). High false rejection rates in a commercial system are not conducive to easy consumer acceptance of the technology because of the anger and embarrassment that may easily be caused when a person who should be known to the system is incorrectly denied access. Generally however, the false acceptance and false rejection characteristics of a practical biometric system may not be as well separated as might be predicted from laboratory studies, because in the real world the quality of biometric data may not be ideal. Exactly the same considerations may apply to non biometric matching tasks. Although an embodiment of the invention is described in terms of specific biometric matching, in particular iris matching, the scope of the invention is not limited to any one kind of biometric image, nor is it limited to biometric images in general.

SUMMARY OF THE INVENTION

The present invention preferably relates to a method of improving the separation of the false accept and false reject characteristics of a system based on comparison of pairs of templates derived from images by directing the comparison to regions of the templates that are known from theory, experiments, experience, or even common sense to be more reliable for matching.

According to a first aspect of the present invention there is provided a method of determining whether a first image matches a second image, comprising: extracting from said first and second images respective first and second templates, each template comprising a spatial arrangement of template codes; overlaying on said first template a master mask comprising a spatial arrangement of master mask codes, each master mask code being representative of an expected variability or matching reliability within a population of images of a template code of corresponding spatial location; comparing said overlaid first template with said second template; and determining whether a match exists in dependence upon said comparison.

In a preferred embodiment, the method includes the step of deriving the master mask codes from a population of images.

According to a second aspect there is provided a system for determining whether a first image matches a second image, comprising: means for extracting from said first and second images respective first and second templates, each template comprising a spatial arrangement of template codes; means for overlaying on said first template a master mask comprising a spatial arrangement of master mask codes, each master mask code being representative of an expected variability or matching reliability within a population of images of a template code of corresponding spatial location; means for comparing said overlaid first template with said second template; and means for determining whether a match exists in dependence upon said comparison.

The invention further extends to a computer program arranged to execute a method as previously defined. It further extends to a computer-readable medium holding any such computer program.

BRIEF DESCRIPTION OF THE DRAWINGS

The invention may be carried into practice in a number of ways and one specific embodiment will now be described, by way of example, with reference to the accompanying drawings, in which.

DETAILED DESCRIPTION

A preferred application of the present invention is in the field of iris recognition. However the field of application of the method is very broad and is not limited by the examples given. It will be understood that the invention could be applied in many biometric and non-biometric fields for image matching and/or for individual or object recognition.

Figure 1:
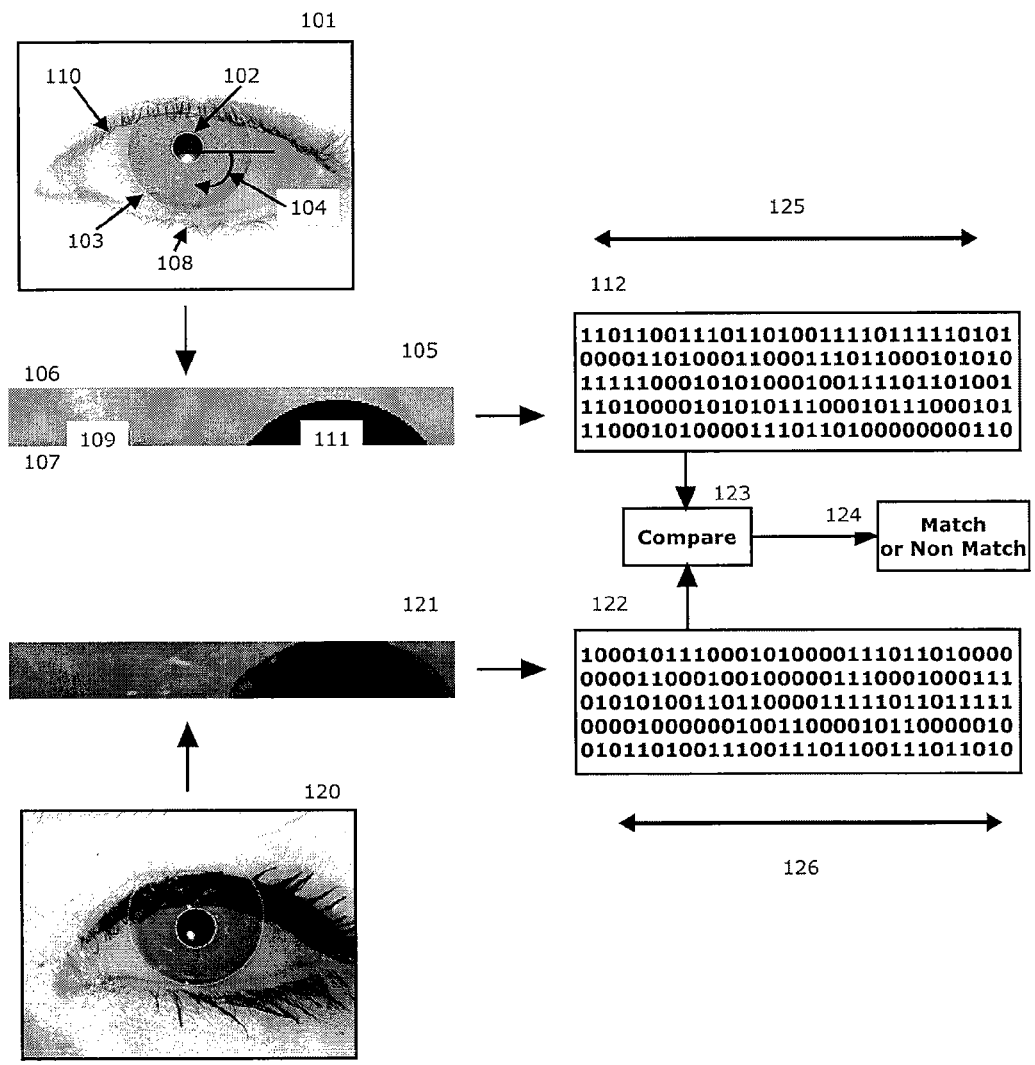
FIG. 1 is a schematic drawing in which features are extracted from a pair of images which are then transformed to templates of codes for comparison.

FIG. 1 describes the preparation and matching of templates formed by extracting features from images and then coding these image features. The subject matter of FIG. 1 is all well known in the field of pattern recognition and is summarized in a general form to assist in understanding of the subject matter which follows.

With reference to FIG. 1, biometric images of a first eye 101 and a second eye 120 are to be compared to determine if they are from the same individual. To make such a comparison, features may be extracted from the images to be compared. In the case of iris recognition, normalised forms of the iris images are first prepared as is known in the field, and these could be considered as a collection of iris features.

Continuing the specific example of FIG. 1, to extract the iris from the eye 101, the outlines of the pupil/iris boundary 102 and the iris/sclera boundary 103 are first determined. Starting from some reference radius 104 with respect to a common centre, an unwrapped image of the iris 105 is determined by a mapping of the annular iris from image 101 onto a rectangular image 105. As shown the pupil/iris boundary 102 is mapped onto the upper edge of the unwrapped image 106 and the iris/sclera boundary is mapped onto the bottom of the unwrapped image 107. If the mapping is carried out by moving the radius clockwise in the iris annulus, and from left to right in the unwrapped image, then the lower eyelid 108 in the eye image would appear at position 109 in the unwrapped image, and the upper eyelid 110 in the eye image would appear at 111 in the unwrapped image. Commonly, the eyelid would be identified and may be used to control what region of the unwrapped image is later used for matching. In the particular eye shown at 101, the lower eyelid 108 does not occlude the unwrapped image 106, but the upper eyelid 110 does appear in the unwrapped image 107 at 111 and is shown as blacked out.

Similarly a second eye image 120 can be unwrapped to give a second unwrapped image 121.

A transformation or other coding may now be carried out in selected positions throughout an unwrapped image. The transformation may be converted in various ways, but typically one or more binary digits form a local code of the image and are combined into a template corresponding to the selected positions in the unwrapped image from which said codes are derived.

In FIG. 1, a first template 112 is derived from unwrapped image 105, and a second template 122 is derived from unwrapped image 121. At this point in the example, two templates have been formed from two images to be matched, and the description of the method can become completely general, applicable to the matching of any two images of any type whatsoever.

In FIG. 1, a comparison of the codes making up the templates 112 and 122 is made at 123 in such a way as to give a value at 124 indicative of whether the templates match or do not match. The templates derived from two different images are then compared or combined in some way to determine whether the two images match or do not match, or more specifically to determine how well they match.

Any convenient matching algorithm may be used for that purpose: for example, the templates may be compared bit by bit, and a count taken of the number of bits which are the same, which is known as a Hamming distance. Usually the numbers of bits which are the same will be divided by the total number of bits compared to give an average Hamming Distance. A weighted Hamming Distance may also be used, as described below. Non-matching templates in many applications may consist of bits that are uncorrelated and are different as often as they are the same, matching only at random. In such a case an average Hamming distance of 0.5 will be obtained, but with actual values distributed about this mean value. In the case where two templates match a low average Hamming distance may be found. A perfect match would of course give a Hamming distance of zero, but such a perfect match is rare in practical systems because two different templates which are images of the same object may often be contaminated by imperfect alignment, obscurative or additive noise, differences in illumination or contrast, occlusion of the object and many other forms of interference.

A match is then declared if the number of bits that differ or Hamming distance is lower than a defined threshold, either by absolute number or by average. More generally, one may define the strength of a match in dependence upon any required metric of the two codes which are being compared, either weighted or unweighted.

In cases of uncertainty about the registration or alignment of the templates, the comparison may be made by searching for a best match over a range of displacements of the templates. In iris recognition, for example, horizontal displacements of one or both templates corresponds to rotation of the eye between the pairs of images being matched and a search in this direction can be used to improve recognition. It will be evident that such a displacement can be achieved by rotation of codes from one end of the template to the other or, as might be preferred for speed, extending one or more of the templates before the search is carried out. In this manner, a decision may be made about whether the two eyes images 101 and 120 are from the same individual or not. In FIG. 1 bidirectional arrows 125 and 126 indicate that either or both of the corresponding templates 112 and 122 may be shifted in order to carry out the comparison at various positions. The "best" position may be determined by any convenient metric.

Masking of Unreliable Regions

With any given biometric it may be the case that certain regions of a template are more reliable that others for matching, that is, certain regions may be contaminated by noise or interference or occlusion and so may not contribute reliable information to the comparison. Other regions may be more reliable.

In iris recognition for example, the left and right sides of an iris are much less likely to be obscured by eyelids and eyelashes than the upper and lower parts. Similarly it is often observed that a camera arranged to capture magnified images of the iris may pick up a reflection of the subject's nose, on the right side (as seen from the camera) of the image of a right eye and the left side (as seen from the camera) of the image of a left eye. The effect of these obscurations are to make these regions often behave as if they are not matching, typically increasing the Hamming Distance of matching templates locally and causing some uplift to the overall Hamming Distance finally used to decide if two images match. This is one reason why a Hamming Distance of zero is rare in practical systems.

The same considerations may also of course apply to templates derived in any pattern matching application.

The present embodiment, described specifically in connection with iris images, includes a means of spatially marking and removing or at least weighting more lightly those regions of the templates which are unreliable, leading to improved accuracy of recognition or matching. This is done by forming what will here be called a 'master mask'. A master mask indicates, preferably in one-to-one correspondence with codes or groups of codes in the template, which positions are unreliable and therefore may be wholly or partially ignored in matching. In the illustration to be given the codes of the master mask are binary, one of the binary digits indicating a masking or ignoring of a portion of the template and the other binary digit indicating those portions of the template that are to be taken into consideration. More generally, master masks may consist of numbers which are not binary but cover some range which indicates a weighting of portions of the template. Typically the minimum of the range, possibly zero, might indicate a weighting of zero, and the maximum of the range indicating a maximum weighting. Most conveniently the range of the weighting would be zero to 1, and a weighted Hamming Distance may be calculated as $$HD = \frac{\sum (codea \otimes codeb) \times \text{weighting}}{\sum \text{weightings}} \quad (1)$$

Where ⊗ indicates the exclusive OR operation in which the result is 1 for identical codes and 0 for differing codes. A summation with weighting specified by the master mask is applied and the whole divided by the total of the weightings to give an average weighted Hamming Distance.

Figure 2:
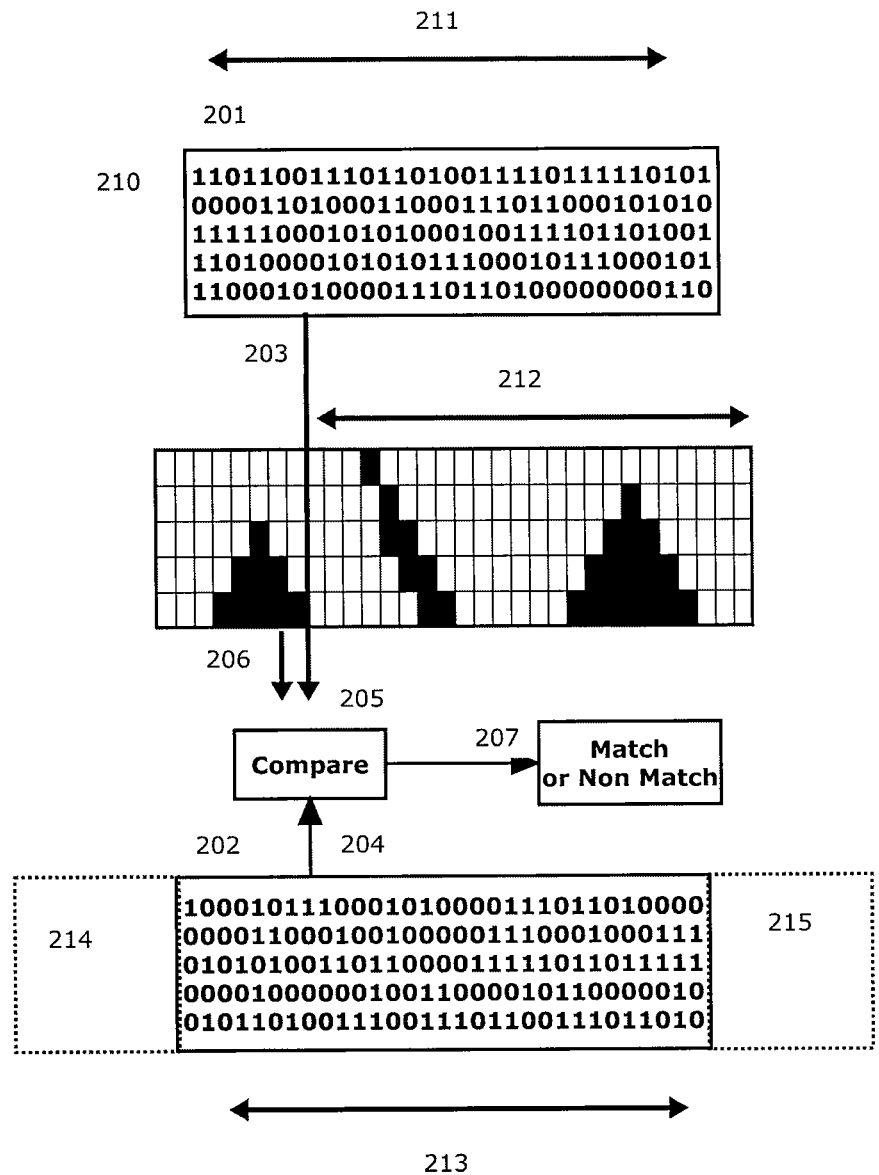
FIG. 2 is a schematic drawing in which two templates are compared using the subject matter of the present invention.

FIG. 2 illustrates the comparison of two templates with reference to a master mask. Two templates 201 and 202 of a particular type are derived from different images by a process similar to that described in FIG. 1, or by any other process, are aligned with each other. A master mask 210 is obtained by some means as will be discussed below. Codes taken from corresponding template positions 203 and 204 are compared at 205 using a weighting 206 taken from a corresponding position in the master mask 210. The comparison may be according to an equation such as (1), summing over all the template positions with reference to the master mask at corresponding positions, or by any other means. The result at 207 may be compared against a suitable threshold to give a decision whether the templates match or do not match.

Shifting of any two of the master mask and the templates may compensate for any misalignment. In FIG. 2 the arrows 211, 212 and 213 indicate shifting that might take place, although it will be clear than only two of the three possible modes of shifting will allow for all relative displacements of the templates and the master mask.

In this case of iris recognition as previously described, this shifting by one position corresponds to a rotation of the iris in the original image by one code position and may be achieved by rotation of the template horizontally, or more practically by extending it horizontally to allow for as many discrete rotations as may be desired.

Preferably a first template such as 201 may be the one to be held in a fixed position to minimize its size, and such a first template may be as entered into a database of enrolled images or carried for example on a smart card. A second template 202 may be a test template such as taken from a live or other image desired to be matched against the first template. This second template may be extended at 214 or 215 to take account of displacements of the two templates. In the case of iris recognition, extending the second template horizontally allows for relative rotations of the two irises.

In such a preferred implementation both of second template 202 and master mask 210 may be held in as many positions as are desired, with a comparison made in each such position. The matching process may then rely on the smallest weighted Hamming Distance so obtained to indicate matching or non matching of the templates.

However moving two of the three objects (two templates and a master mask) to n positions in one direction, for example, to allow for combinations of image displacement would involve $n^2$ comparisons which may be too costly in a particular application. A suboptimal but still effective use of the master mask can be achieved by applying the master mask to either template and moving only the other template. This could simply mean that only one template is moved, as in FIG. 2. It may be effective to imprint the master mask on an enrolled template, and then simply move the extended test template, making comparisons in each position. In this suboptimal but efficient embodiment, any inaccuracy of aligning the master mask with the static template is still more than compensated for by the effectiveness of the master mask in selecting good iris regions. Of course the presence of a distinctive feature, such as a eyelid in processing iris images, may assist in positioning the master mask accurately.

Figure 3:
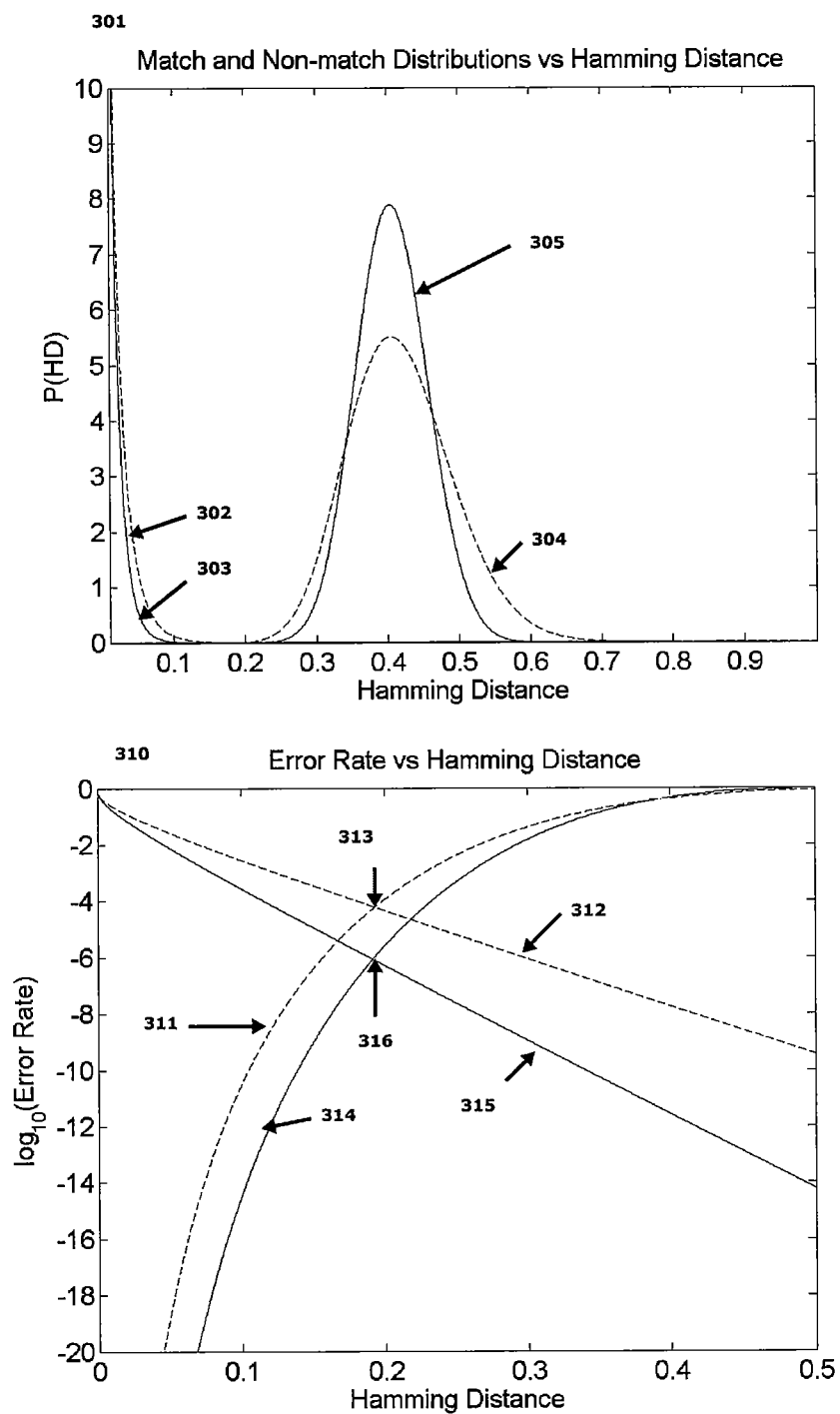
FIG. 3 shows typical operating curves for template matching as could arise in many applications.

The effectiveness of the master mask in improving the matching of templates derived from images may now be described. FIG. 3 illustrates the kind of statistics normally collected from template matching as will be familiar to practitioners in the field of iris recognition.

The graph 301 shows the probability distributions of a typical matching metric applied to images that are known to match or not to match. Any metric indicative of the quality of a match could be used, although the Hamming Distance, or average Hamming Distance or weighted Hamming Distance will often be used. The data of FIG. 3 is taken from a real iris recognition system but the principle of the master mask is not limited to any particular pattern recognition task. Dashed curve 302 is the distribution of a matching metric from templates that should match because they are codes of the same object when the master mask is not used, and solid curve 303 is the matching distribution from the same templates when the master mask is used. The curves are not easily distinguished, but the one using the master mask is shifted to the left. The differences are better revealed in Graph 310 discussed below. Such a matching distribution typically displays a maximum probability at a low value of the matching metric, but also shows a long tail extending towards higher values of the matching metric which is the result of the effects mentioned above, namely imperfect alignment, noise, interference or occlusion, for example. The purpose of the master mask is to mitigate these effects by giving weight to reliable regions of a template.

Dashed curve 304 is an example of the distribution of a matching metric for templates that should not match when the master mask is not used. The peak of this distribution is less than 0.5 because it illustrates the minimum of a range of comparisons a template shifted to different positions. (The curve 302 similarly shows the best match over a range of comparisons.) Curve 305 illustrates the effect of the master mask on the non matching distribution. The distribution is noticeably narrowed which indicates that it is better separated from the matching distribution. The effect of the master mask on this data is to separate the matching and non matching curves better, hence leading to improved matching performance. Similar improvements are to be expected in other template matching systems.

Graph 310 is plotted to a logarithmic scale and shows the differences more clearly. Dashed curve 311 shows the probability of a false match (the False Acceptance Rate or FAR) as a function of the threshold shown for the matching metric without the master mask applied, and is simply the integral of the corresponding non matching distribution. This is derived by fitting a distribution to the non matching curve of 304 and integrating either theoretically or numerically. The FAR rises from zero at a metric of 0 (where nothing is accepted and hence there are no false acceptances), to a value 1.0 at a large value of the matching metric (where everything is accepted and hence the FAR is 100%, because all non matching templates are incorrectly accepted).

Similarly, dashed curve 312 is the probability of a false non match (the False Rejection Rate or FRR) without the master mask applied, obtained by integrating the matching distribution 302 and subtracting from 1.0. It falls from 1.0 at a matching metric of zero (where there will be no accepted matches at all, leading to a FRR of 100%) to a value of zero at a high value of the matching metric (where every match will be accepted and hence the FRR is zero).

The Equal Error Rate (EER) is the value of the FAR and FRR where they are the same. This often leads to a convenient choice of the threshold for the matching metric for accepting a match in a practical system, because it best balances FAR and FMR. At 313 is seen the EER point without the master mask applied in the matching process. For information, and for comparison, with this particular data, the value of the average Hamming Distance at the EER point without the master mask applied is $6.06 \times 10^{-5}$, indicating that in one million matches, about 60 incorrect results would be expected.

The beneficial effect of the master mask is clear in graph 310. The FAR using the master mask is solid curve 314, and the FRR using the master mask is solid curve 315. It is seen that the FAR and FRR are both always less when the master mask is applied, and the difference is quite substantial. The EER point using the master mask is at 316, and its value with this data is $8.64 \times 10^{-7}$, which is nearly 100 times lower than without the master mask. In one million comparisons with the master mask applied in matching, slightly less than one incorrect result would be expected.

These curves are from real data and indicate the effectiveness of the master mask in reducing the EER in a real application.

Of course the threshold for accepting a match could be lower or higher than the value of the matching metric at the EER. In some systems the consequences of a False Accept may be extremely undesirable and so the threshold may be set lower than the EER, giving a cautiously low FAR. The price to pay for that is higher FRR. In the graph 310 it can be seen that the FAR and FRR curves cross at approximately 90 degrees in the logarithmic plot, so that a change in the matching threshold from the EER point that divides the FAR by some factor, multiplies the FRR by approximately the same factor. One can achieve 100 times lower FAR—e.g. about one in 100 million at the cost of 100 times greater FRR—e.g. one in ten thousand. Alternatively it may be preferred that the FRR is low, for example when the consequences of the correct person being denied access are undesirable, in which case the threshold may be set to a higher value than the EER to achieve lower FRR at the cost of higher FAR.

The power and convenience of the master mask are that it is not a static mask and is not bound to the features of any particular template. Rather, it is applied to all templates from a particular source to select regions of the templates arising from such a source that are known to be reliable.

It is a strength of the master mask that it does not rely on direct masking of either template in a matching task, although such masking could be used in addition to the master mask, for example in the non limiting case of iris recognition to isolate eyelids. A master mask is constructed by taking a large number of both matching and non matching images and deciding which codes in a template are the least reliable. There are many ways of doing this. One method of determining a master mask may be by trying each code position in a template in turn to find which one, when removed, leads to the best matching performance as might be measured by the EER (Equal Error Rate) of the process. This identifies a first position in the master mask. Then a second code position to mask can be determined, and so on. Successively removing codes from an unmasked template will progressively reduce the EER up to some point where the EER will begin to oscillate because the number of codes remaining is too small to give a statistically reliable total or average matching score.

The master mask, instead of being a simple binary mask totally accepting or rejecting codes from a template region, could be a weighting of each template region or individual template code indicating statistically the relative effectiveness, reliability or variability of a region. The process of constructing such a mask is clearly more complex than that of successively removing the least useful code positions, but the gain in matching performance is likely to be well worth the extra effort. Of course, large amounts of template data may be required to construct master masks.

One method of generating a binary master mask relies on a test database of iris images of many individuals, with each individual being represented multiple times. For example, each individual may have many stored images taken under a variety of lighting conditions, angles, contrast, magnifications and so on. Thus, the total number T of images in the database may consist of M pictures of each of N individual irises, where $T = M \times N$.

It will be understood that all of the M images of each iris should match, but that because of image variability they will not do so exactly. Taking one iris image as the master, a first is then carried out for the other (M−1) images in the set, and a Hamming distance calculated between each block value and the corresponding block value of the master image. This is repeated for all N sets of M images in the database, and an average Hamming distance calculated for each block. The block with the greatest distance (i.e. the block that degrades the fits the most, on average) is then removed—or considered to be masked—and the process is repeated. Blocks are masked one by one until a point is reached at which further masking no longer consistently improves the average fit, or until the improvement is swamped by noise.

The master mask is the defined by the locations of those blocks have been removed during this process. Other approaches to generating the master mask, in dependence upon the average reliability or variability of individual blocks within each of the N sets, or based on some other error metric in fitting to a known image, could of course be taken.

More sophisticated master masks could be created by weighting the individual blocks, rather than simply removing them. This could be done using the method described above to find the "worst" block (the block that, on average, degrades the fits the most). Then instead of removing the block entirely, a weighting is applied to it and the calculations re-done to see if the fits improve on average, for example by determining the EER. Different weightings are applied, for example 0.9, 0.8, 0.7, 0.6 and so on, and the weight is chosen as that which produces the best fit on average. The next-worst block is then taken, and the process repeated for that block. The entire process is repeated until no further consistent improvement is found.

Other methods could of course be used to weight the blocks, rather than stepping through a sequence of values. For example, for a given block the weight could be considered a variable, and the value calculated numerically on the basis of minimizing an error metric such as the average Hamming distance. Given sufficient computing power, multiple weights could be calculated at the same time using a multi-dimensional minimization routine.

A weighted mask, calculated as above, will automatically converge on weights that, on average, improve the fit to known images the most, and hence will be expected to improve performance in real-life situations. The weightings automatically allow not only for the fact that some blocks may be more reliable than others, but also for the other possible factors such as the greater detail that can be found in the region of the iris close to the pupil, when compared in the areas near the sclera. Similarly the weightings allow for the fact that the blocks do not all represent equal areas of the iris, due to be conversion from polar to Cartesian co-ordinates.

The master mask is extremely versatile. In the specific, non limiting example of iris recognition one could have a single master mask representative of all irises. One could further improve recognition by having one master mask for left eyes and another for right eyes, since it is frequently observed in iris image that a reflection of the nose may degrade one side of the iris image. Also iris recognition may depend on the characteristics of the camera being used, for example contrast, dynamic range and brightness may be different for different types of iris camera. A master mask could be derived for any specific camera type. Also the actual positioning of a camera in the field may affect the reliability of template data from different regions of the template, for example if there is uneven lighting or spurious reflections. As yet another example there may be differences between populations (as for example are evident in iris pigmentation and the degree of obscuration by eyelids and/or eyelashes) which may make different master masks relating to known background effective in improving matching in practical systems.

Given enough data, bespoke master masks can be constructed for any of the above cases, and of course their utility is not limited to iris or other biometric image recognition. It is also possible that a matching system could learn its master mask adaptively and gradually over time improve its performance.

The invention is not limited to the examples given, and could be applicable in any situation where images are to be matched or where there is a need to determine whether a test image does or does not match (to within a certain error threshold or according to some error metric) a stored image. More generally, the invention may be used to improve image recognition, by determining whether a test image is or is not of a specific individual or object as represented by stored images that are known to be of that individual or object. The invention extends to other embodiments within the spirit and scope of the appended claims.

What is claimed is:

1. A method of determining whether a first iris image matches a second iris image, comprising:
   extracting from said first and second iris images respective first and second templates, each template comprising a spatial arrangement of template codes;
   overlaying on said first template a master mask comprising a spatial arrangement of master mask codes, each master mask code being representative of an expected variability or matching reliability within a population of iris images of different individuals of a template code of corresponding spatial location;
   comparing said overlaid first template with said second template; and
   determining whether a match exists in dependence upon said comparison, said match indicating that said first and second iris images are images of the same human or animal individual.

2. A method as claimed in claim 1 including the step of generating the master mask from a plurality of existing images.

3. A method as claimed in claim 2 in which the plurality of existing iris images includes a plurality of iris image pairs that are known to match.

4. A method as claimed in claim 3 in which the master mask is generated by applying a matching algorithm to said pairs of iris images that are known to match and defining each said master mask code in dependence upon a variability or matching reliability of a template code of a corresponding spatial location for said pairs.

5. A method as claimed in claim 4 in which said variability or matching reliability is defined in dependence upon an average taken across all said pairs.

6. A method as claimed in claim 5 including setting a value of a least reliable master mask code, re-applying said matching algorithm using said value, and setting a value of a second least reliable master mask code.

7. A method as claimed in claim 6 including iteratively re-applying said matching algorithm to set all values of said master mask code until a matching error reaches a noise value.

8. The method of claim 2 wherein the master mask is generated from template codes of said plurality of existing images.

9. A method as claimed in claim 1 in which said template codes are binary codes.

10. A method as claimed in claim 9 in which said master mask codes are binary codes.

11. A method as claimed in claim 10 in which said master mask codes are in one-to-one correspondence with said template codes.

12. A method as claimed in claim 1 in which said master mask codes comprise weightings to be applied to corresponding spatial locations of said first template.

13. A method as claimed in claim 1 in which determination of a match is dependent upon an average distance metric, for example a Hamming distance, between said overlaid first template codes and said second template codes.

14. A method as claimed in claim 1 in which the determination of a match is dependent upon an average weighted distance metric, for example a weighted Hamming distance, between said overlaid first template codes and said second template codes.

15. A method as claimed in claim 1 in which said master mask is overlaid in a plurality of spatial positions on said first template to find a position of best match.

16. A method as claimed in claim 1 in which said first or second templates, or both, have individual masks which are applied in addition to said master mask.

17. A method as claimed in claim 1 in which said master mask is applied to said first template to create a stored composite template, said stored composite template then being compared with said second template.

18. A method as claimed in claim 1 in which said one of said first and second iris images is a candidate for verification against the other of said first and second iris images.

19. A method as claimed in claim 1 in which one of said first and second iris images is retrieved from a stored database for one-to-many matching against the other of said first and second iris images.

20. A method as claimed in claim 1 in which one of said first and second iris images is compared with a plurality of the other of said first and second iris images.

21. A method as claimed in claim 1 in which said second template is compared at a plurality of locations against said overlaid first template to find a second template position of best match.

* * * * *